United States Patent [19]
Reinhardt et al.

[11] 3,966,569
[45] June 29, 1976

[54] METHOD OF RECOVERING METAL FROM METALLIFEROUS WASTE

[75] Inventors: Hans Reinhardt, Vastra Frolunda; Harald Daniel Ottertun, Molndal, both of Sweden

[73] Assignee: MX Processor Reinhardt & Co. AB, Sweden

[22] Filed: Feb. 25, 1975

[21] Appl. No.: 552,923

Related U.S. Application Data

[63] Continuation-in-part of Ser. No. 537,905, Jan. 2, 1975, abandoned.

[30] Foreign Application Priority Data
Jan. 28, 1974   Sweden ............................ 7401085

[52] U.S. Cl. .............................. 204/108; 204/112; 75/101 BE; 75/117; 75/119; 75/120; 75/121; 423/24; 423/36; 423/55; 423/139; 423/146
[51] Int. Cl.² ...................... C25C 1/08; C25C 1/12
[58] Field of Search ............... 75/101 BE, 117, 119, 75/120, 121; 423/24, 36, 139, 146, 55, 100; 204/108, 112

[56] References Cited
UNITED STATES PATENTS
2,992,894   7/1961   Hazen et al. ..................... 75/101 BE
3,251,646   5/1966   Alon et al. ........................ 75/101 BE
3,284,501   11/1966  Swanson ......................... 75/101 BE
3,455,680   7/1969   Ashbrook et al. ............... 75/101 BE
3,479,378   11/1969  Orlandini et al. ............... 75/101 BE
3,676,106   7/1972   Hazen ............................. 75/101 BE
3,809,624   5/1974   Kane et al. .......................... 204/108

*Primary Examiner*—R. L. Andrews
*Attorney, Agent, or Firm*—Burns, Doane, Swecker & Mathis

[57] ABSTRACT

Metal can be recovered from metal-containing waste by means of liquid extraction processes. The waste is leached with sulphuric acid. The resulting metal sulphate solution is contacted with an organic solution of a reagent, so as to extract iron and zinc to the organic solution. The organic solution is washed with sulphuric acid in two steps, viz. with weaker acid in the first step, so as to transfer zinc to the washing solution, and with stronger acid in the second step, so as to transfer iron to the washing solution. Zinc and iron have now been separated, and are recovered from the washing solutions in known ways, for example by crystallization. If the waste contains other metals, in addition to iron and zinc, additional selective liquid extraction processes are added, before or after the iron-zinc-extraction.

8 Claims, 1 Drawing Figure

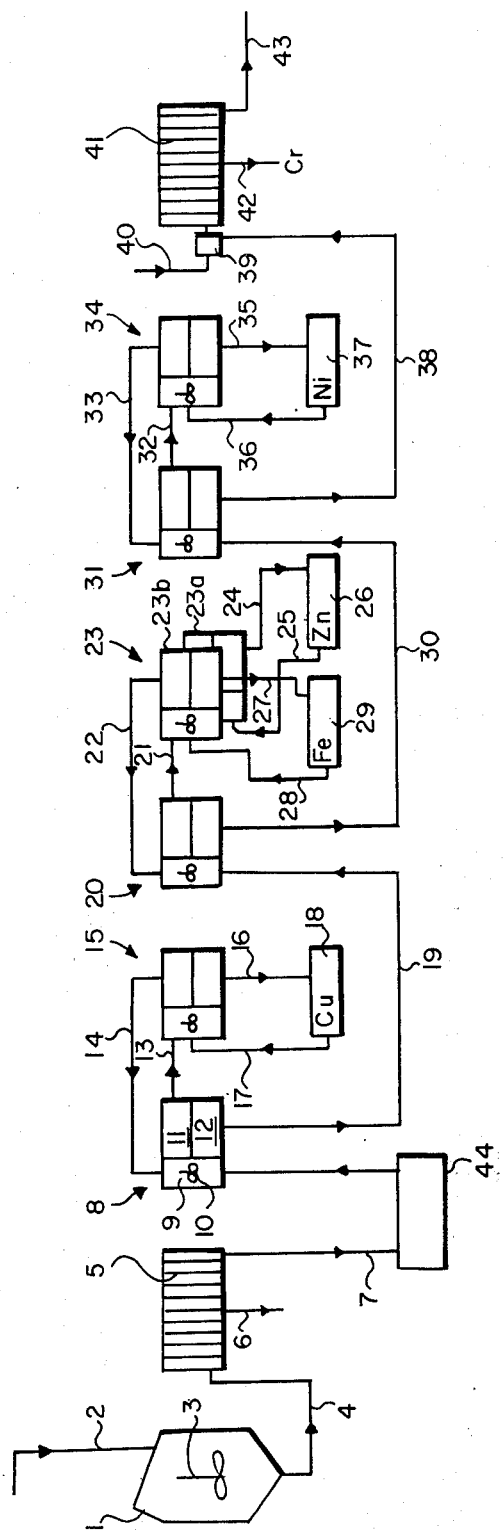

METHOD OF RECOVERING METAL FROM METALLIFEROUS WASTE

The present application is a continuation-in-part of our application Ser. No. 537,905, filed Jan. 2, 1975, now abandoned.

The invention relates to a method of recovering metal from solid metal-containing waste, such as metalliferous hydroxide slurry. The solid waste may be for example metal scrap, ashes, slag, or various types of powder or dust, for example dust recovered from various pyrometallurgical processes. The invention applies primarily to the recovery of metal from metal slime, i.e. a mixture of solid metal-containing particles and water. Such metal slime is obtained, for example, as metal oxide or hydroxide from plants for pickling metal with acid, from plants for coating metals electrolytically or from other surface-treating plants. It is a particular object of the invention to provide a process for recovering iron and zinc, and for separating the zinc, thus recovered, from the iron. It is another particular object of the invention to provide an inexpensive method for recovering metals from metal-containing waste, so as to provide an economic alternative to the disposal of metal wastes by releasing them into lakes or rivers.

It is known that metal can be recovered from metalliferous ore by leaching the ore so that the metal content is dissolved, and then separating the desired metal ions from the solution with the help of an organic solution. The separation process is known as liquid extraction and comprises mixing a water solution containing a desired substance, often in low concentration and together with other substances, with an organic solvent containing an organic reactant. The desired substance reacts with the reactant, and the chemical compound produced is more soluble in the organic solution than in the water solution. For this reason the desired substance will be extracted over to the organic solution.

To obtain the extracted substance the organic solution is mixed in a washing operation with an aqueous solution having such composition that the chemical compound formed by the substance and the reactant is split, and the substance is thus obtained in the aqueous solution in pure form. Adjustment of the liquid flows gives an increased concentration of the substance in the aqueous solution to often 10–100 times that of the original water solution. When the desired substance has been removed from the organic solution the solution is returned for renewed extraction either directly or after having been cleaned to a certain extent from impurities.

Attempts at applying this method on a large scale to metal hydroxide slime have so far been unsuccessful, probably primarily because slime from various origins but having similar composition, the metals often being present in small quantities, has resulted in the metals being recovered through various processing methods. In a central plant for collecting and treating metal slime from many different factories, therefore, considerable work has been necessary to analyse the various batches of slime and to adjust the recovery process after practically every batch. The high costs of analysis and treatment make the process unrealistic from the economic point of view.

The method according to the invention is characterised in that, preferably after metal wastes of various origins have been mixed, the waste is leached with sulphuric acid to form a metal sulphate solution having a pH value of 0–5, that the solution is then subjected to liquid extraction with an organic solution to remove iron and zinc from the sulphate solution, and that the organic solution containing iron and zinc is treated with a water solution of sulphuric acid in two steps, namely in a first step with a solution containing 50–200 g/l free sulphuric acid, resulting in zinc being selectively transferred to the sulphuric acid solution, and in a second step with a solution containing 500–1000 g/l free sulphuric acid, resulting in iron being selectively transferred to the sulphuric acid solution, and that the zinc and iron are removed from the sulphuric acid solutions thus obtained, by means of known methods.

The method of the invention can be combined with recovering metals different from iron and zinc. This is effected by adding one or more liquid extraction operations before or after the extraction of iron and zinc. Of particular interest is the recovery of metals from metal waste, such as metal hydroxide slime, containing iron, zinc, nickel, chromium, and copper. The invention makes it possible to use a simplified method for recovering said five metals. It is unnecessary to separate wastes of different compositions for the leaching process. On the contrary, it is advantageous to mix different types of wastes in order to homogenize the mixture. During the subsequent separation process the five metals iron, nickel, zinc, chromium and copper are substantially completely isolated, and a substantially neutral solution is left which has a low content of heavy metals, or none at all, and which can therefore be released into a lake or river. Examination of a large number of metal hydroxide slimes has shown that on average more than 95 percent of the metal content consists of said five metals. The simplified method for recovering said five metals is characterized in that, preferably after metal hydroxide slimes of various origins have been mixed, the slime is leached to form a metal sulphate solution having a pH value of 0–5, that the solution is then subjected to three liquid extractions with different organic solutions, copper being removed in the first extraction, iron and zinc in the second and nickel in the third, and that the solution thus treated is finally neutralized to induce precipitation of chromium, if present, in the form of hydroxide, and the hydroxide formed is separated from the solution.

It is important that the metal sulphate solution containing said five metals is not too acid, and that the extractions are performed in the order stated, since otherwise the five metals cannot easily be separated from each other. The process can be performed even if the slime does not include all said metals. However, in order to provide a simplified process it is assumed that all three extraction stages are to be performed irrespective of variations in the composition of the slime. The absence of one of the metals will therefore only mean that the corresponding extraction will be operating "idly". It is advisable for a plant for carrying out this embodiment of the invention to have a certain storage capacity for slime, so that slimes having different compositions can be mixed before they are leached.

The invention will be further explained in the following with reference to the accompanying drawing which shows schematically a plant for recovering metals from slime containing not only iron and zinc but also copper, nickel and chromium.

The plant comprises a leaching vessel 1 with an inlet 2 for slime, sulphuric acid, and water, a stirrer 3 and an outlet 4 connected to a filter 5. This filter is provided with an outlet 6 for leaching remains and an outlet 7 which conducts the filtered leaching solution through a tank 44 to a first extraction unit 8. Each stage in the extraction unit is of the "mixer-settler" type and comprises a mixing chamber 9 in which the leaching solution is mixed with an organic solution with the help of a stirrer 10, resulting in copper being extracted over to the organic solution, and a separation chamber 11, 12 in which the two liquid phases, which should be substantially insoluble in each other, are allowed to separate due to their different densities. The lighter phase (usually the organic solution) is then collected in the upper part 11 and the heavier phase in the lower part 12. An extraction unit consists of one or more mixer-settler units. If multi-step extraction is used, this is performed in countercurrent flow. Pipes 13, 14 connect the extraction unit 8 to a washing (stripping) unit 15 where each step is of the same "mixer-settler" type as the steps in the extraction unit. The washing unit may also consist of one or more mixer-settler units. Copper is removed in the washing unit 15 from the organic solution to an aqueous washing solution. Pipes 16, 17 connect the washing unit 15 to an apparatus 18 for removing the copper from the washing solution. The lower part 12 of the separation chamber 11, 12 is connected by a pipe 19 to a second extraction unit 20 for the extraction of iron and zinc. The extraction unit 20 is connected by pipes 21, 22 to a double washing unit 23 comprising two units 23a, 23b where the various steps in each unit are of mixer-settler type. Unit 23a is connected by pipes 24, 25 to an apparatus 26 for removing zinc. Unit 23b is connected by pipes 27, 28 to an apparatus 29 for removing iron. The lower part of the separation chamber in the extraction unit 20 is connected by a pipe 30 to a third extraction unit 31 for the extraction of nickel. The extraction unit 31 is connected by pipes 32, 33 to a washing unit 34 which in turn is connected by pipes 35, 36 to an apparatus 37 for the removal of nickel from the washing solution. The lower part of the separation chamber in the extraction chamber 31 is connected by a pipe 38 to a tank 39 to which sodium hydroxide is supplied through a pipe 40 to neutralize the acid solution. The chromium hydroxide thus precipitated is filtered off in a filter 41 and the filter remains are removed through an outlet 42 and the filtrate through a pipe 43.

The individual steps in the plant according to the drawing will now be described in more detail.

The metal hydroxide slurry entering the leaching vessel 1 usually has a pH value of 8–9. The slime is normally either in the form of a slurry having a solids content of 0.2–20 percent, or in the form of filter cakes having a solids content of 20–60 percent. Sulphuric acid, suitably concentrated, is added in a quantity equivalent to the total quantity of metal in the hydroxide slime. Water is added so that the metal content in the leaching solution is 30–60 g/l. The pH value is 0–5, preferably less than 0.5. The upper limit for the metal content is determined by the solubility of the various metal sulphates. The temperature may be normal, but is suitably slightly raised, preferably 35°–60°C. After sedimentation of the leaching remains in the leaching vessel 1, the leaching solution is transferred through the outlet 4 and the filter 5 to a tank 44. Water is supplied once or more through the inlet 2 to wash the sedimented leaching remains. The washing water containing the leaching remains is transferred through the outlet 4 and the filter 5, where the insoluble leaching remains are filtered off, to the tank 44. The quantity of washing water is adjusted so that the metal content in the tank 44 is about 15 g/l. This metal content has been selected in the event that the main quantity of metal comprises only one of the metals iron, nickel, zinc, chromium and copper, since the three separate extraction units 8, 20, 31 are so dimensioned that they do not function well with higher metal contents.

The acid metal sulphate solution is now introduced in the mixing chamber 9 of the first extraction unit, where it is mixed with a first organic solution supplied through the pipe 14, this solution containing a reactant which selectively extracts copper but none of the other metals mentioned above. Suitable reactants are those commercially available under the trade names LIX-64N, manufactured by General Mills Chemicals, Inc., or Kelex-120, manufactured by Ashland Chemicals, Inc. These reactants form chelates together with copper ions. For further details concerning these reactants, reference is made to Flett: International Symposium, Solvent Extraction in Metallurgical Processes (Antwerp, Belgium, May 1972; pages 22–27). As shown by Flett on pages 22 and 23, "LIX-64N" is a mixture of an alkyl 2-hydroxybenzophenone oxime and an alpha-hydroxy oxime. "Kelex-120" is disclosed by Flett (page 26) to be based on 8-hydroxyquinoline. The reactant is used diluted with an organic solvent, a so-called diluent. Aliphatic or aromatic hydro-carbon of low viscosity at the working temperature is often used as diluent, such as a petroleum fraction with a boiling point interval corresponding to kerosene and with a high flash point from the point of view of safety. The use of an organic solution consisting of 70–95 percent by weight kerosene and 5–30 percent by weight reactant is preferred.

When the lighter organic solution has separated from the water solution in the separation chamber 11, 12, it is conducted through the pipe 13 to the mixing chamber of the washing unit 15 where it is mixed with a strong sulphuric acid solution containing 200–1000 g/l free sulphuric acid, preferably about 300 g/l free sulphuric acid, supplied through pipe 17. Due to the action of the strong sulphuric acid the chelate is split and copper ions are transferred to the sulphuric acid solution. The flow of sulphuric acid solution is suitably adjusted so that the solution leaving the separation chamber through pipe 16 contains 20–30 g/l copper. Copper is recovered from this solution in apparatus 18. This can be done by cooling the solution to cause crystallisation of copper sulphate. However, it is preferred to recover metallic copper by electrolysis. It has been found advisable to remove only 20–50 percent of the copper content from the washing solution and to permit the depleted solution to return to the washing unit 15, possibly with added sulphuric acid, through pipe 17 for further washing out of the copper.

The water solution from the extraction unit 8 is transferred through the pipe 19 to the extraction unit 20 where it is mixed with a second organic solution of a reactant supplied through pipe 22, this reactant (when copper has been removed) selectively extracting iron and zinc, but not nickel or chromium. An example of such a reactant is an organo-phosphorus acid having the general formula:

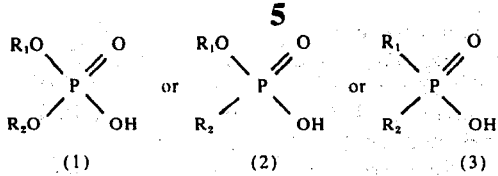

The organic radicals $R_1$ and $R_2$ may be the same or different and are chosen so that the organophosphorus compound will not be noticeably soluble in water. $R_1$ and $R_2$ are preferably selected from the group consisting of straight chain, branched and cyclic alkyl groups having 4–12, preferably 5–10, carbon atoms, and phenyl.

In this specification we have generally referred to the acidic organophosphorus compounds (1) – (3) as alkyl or dialkyl phosphoric acids. More precisely, the compounds (1) should be referred to as dialkyl phosphoric acids or dialkoxy phosphoric acids, the compounds (2) as alkyl alkylphosphonic acids, and the compounds (3) as dialkyl phosphinic acids. Useful compounds of the type (1) are di-(2-ethylhexoxy)-phosphoric acid,
di-(3, 5, 5-trimethylhexoxy)-phosphoric acid,
di-(cyclohexoxy)-phosphoric acid,
di-(phenoxy)-phosphoric acid,
Phenoxy-(2-ethylhexoxy)-phosphoric acid,
Phenoxy-propoxy-phosphoric acid, and
Phenoxy-cyclohexoxy-phosphoric acid. Useful compounds of the type (2) are
(2-ethylhexoxy)-(2-ethylhexyl)-phosphonic acid,
(2-ethylhexoxy)-phenyl-phosphonic acid,
(n-butoxy)-phenyl-phosphonic acid,
Phenoxy-cyclohexyl-phosphonic acid,
Phenoxy-phenyl-phosphonic acid,
Cyclohexoxy-cyclohexyl-phosphonic acid, and
Methylisobutoxy-(n-octyl)-phosphonic acid. Useful compounds of the type (3) are
di-(2-ethylhexyl)-phosphinic acid,
di-(cyclohexyl)-phosphinic acid,
di-(phenyl)-phosphinic acid,
di-(n-butyl)-phosphinic acid,
di-(n-octyl)-phosphinic acid,
Phenyl-cyclohexyl-phosphinic acid, and
(3,5,5,-trimethylhexyl)-(n-butyl)-phosphinic acid.

The organo-phosphorus acid can be used in pure, concentrated form if it has suitable physical properties at the working temperature in question. However, we prefer to use it diluted with a diluent which must have extremely good solubility for the organo-phosphorus acid and which must be difficult to dissolve in water. As previously, an aliphatic or aromatic hydrocarbon having low viscosity at the working temperature may be used, such as a petroleum fraction with a boiling point interval corresponding to kerosene and with a high flash point from the point of view of safety, or an aromatic hydrocarbon such as benzene, or a chlorinated hydrocarbon such as carbon tetrachloride. We prefer to use an organic solution consisting of 70–80 percent by weight kerosene and 20–30 percent by weight di-(2-ethyl hexoxy)-phosphoric acid.

The organic solution containing zinc and iron is now washed in the washing unit 23 with sulphuric acid in two steps so that the zinc is separated from the iron. In the washing unit 23a the organic solution is treated with a sulphuric acid solution containing 50–200 g/l free sulphuric acid, preferably 80–120 g/l free sulphuric acid. The zinc will then be substantially completely transferred to the sulphuric acid solution, but hardly any of the iron. The organic solution from which the zinc has been removed is then treated in the washing unit 23b with a strong sulphuric acid solution containing 500–1000 g/l free sulphuric acid, preferably about 800 g/l free sulphuric acid. The iron will now be substantially fully transferred to this stronger sulphuric acid solution. The zinc-bearing sulphuric acid solution is cooled in the apparatus 26 so that some of the zinc sulphate crystallizes. More sulphuric acid is added to the mother liquor and it is returned, possibly after heating, to the washing unit 23a. The ferrous sulphuric acid solution is cooled in the apparatus 29 so that some of the iron sulphate crystallizes. More sulphuric acid is added to the mother liquor and it is returned, possibly after heating, to the washing unit 23b. Alternatively, zinc and iron may be removed from the sulphuric acid solutions by other methods, such as electrolysis.

The water solution from the extraction unit 20 is led through pipe 30 to the extraction unit 31 where it is mixed with a third organic solution of a reactant supplied through pipe 33, said reactant (after copper, iron and zinc have been removed) selectively extracting nickel but not chromium. A suitable reactant is a dialkyl dithiophosphoric acid having the general formula:

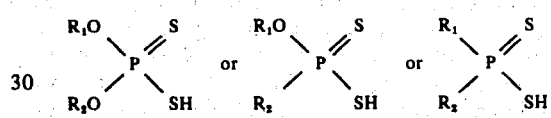

The organic radicals $R_1$ and $R_2$ may be the same or different. They consist of a straight or branched hydrocarbon. To ensure that the dialkyl dithiophosphoric acid is not noticeably soluble in water the organic radical should contain 4–12, preferably 7–10 carbon atoms. We prefer to use dioctyl dithiophosphoric acid.

Here also the reactant may be used in pure form if it has suitable physical properties or diluted with a diluent, for example kerosene, benzene or carbon tetrachloride. We prefer to use an organic solution consisting of 70–95 percent by weight kerosene and 5–30 percent by weight dioctyl dithiophosphoric acid.

The nickel-bearing organic solution is treated in the washing unit 34 with sulphuric acid having a concentration of 200–1000 g/l, preferably about 800 g/l. It takes a long time to wash out the nickel from the dioctyl dithiophosphoric acid so that a considerably larger mixer volume must be used in the mixer-settler step in this washing unit than in the other extraction and washing stages. The nickel-bearing sulphuric acid solution is cooled in apparatus 37 so that some of the nickel sulphate crystallizes. Alternatively metallic nickel can be recovered by means of electrolysis, but crystallization is preferred. More sulphuric acid is added to the mother liquor and it is returned, possibly after heating, to the washing unit 34.

The water solution from the extraction unit 31 is mixed with NaOH in the tank 39 to give a pH value of 8–9. Chromium hydroxide precipitates together with hydroxides of any other heavy metals which may still remain in the solution. The insoluble hydroxides are separated from the solution in the filter 41. Chromium can be recovered from the filter cakes in known manner. The neutralisation also serves as a safety precaution in the event of any extraction stage having to be temporarily disconnected or not working efficiently.

Neutralisation and filtration of metal hydroxide formed prevents metal from leaving the plant in the waste solution. Neutralisation and filtration also have the advantage that organic substance, for example small quantities of reactant or kerosene accompanying the water solution, is absorbed in the filter cakes and is thus unable to reach the drainage pipe 43. The filtrate will therefore consist of a clean, diluted salt solution, the main component being sodium sulphate, and it can therefore be released to a lake or a river.

The temperature should be maintained the same in the various extraction and washing stages. A suitable temperature range is 25°–50°C. Although the individual stages might operate optimally at different temperatures the advantage of not having to have heat-exchangers is so great that a uniform temperature is preferred. The chemical processing equipment for the liquid extraction requires very little power and the total process will therefore have a low power requirement. The consumption of chemicals in the process is also low. Apart from the addition of sulphuric acid and sodium hydroxide already mentioned, it may be necessary to add sodium hydroxide to the metal sulphate solution at the transition from one extraction unit to the next in order to regulate the pH value. However, very small quantities are involved.

The process described can be varied in different ways within the scope of the invention. For instance, with certain types of metal waste it may be necessary to leach under oxidizing conditions with a monovalent inorganic acid, such as nitric acid. The resultant solution containing metal ions can then be converted to an acid metal sulphate solution in the manner described in Swedish pat. No. 364 187, i.e. by adding sulphuric acid to the leaching solution, or during or after leaching, the quantity of sulphuric acid being slightly more than equivalent to the content of metal ions, and thereafter extracting the monovalent inorganic acid with an organic solution containing a compound which forms an adduct with the monovalent organic acid and which is thus bonded and transferred to the organic solution. The resultant water solution contains only sulphuric acid and metal sulphates and can therefore be treated as described above.

If the metal waste received contains large enough quantities of other metals than the five already mentioned to warrant separating them individually, additional liquid extraction processes may be introduced before, between or after the three extractions described with reference to the drawing, provided that they do not disturb said three extraction processes.

EXAMPLE 1:

Zinc-coated iron scrap was molten in a steel plant. The gas leaving the melting furnace was washed in a wet scrubber to remove the dust accompanying the gas. The dust contained zinc, iron, manganese and lead in these percentages by weight:

Zn - 13
Fe - 3.0
Mn - 4.0
Pb - 9.5

The wet dust thus obtained had a solids content of 43 percent by weight. More water was added, and the slurry was transferred to a leaching vessel. Sulphuric acid having a concentration of 40 percent by weight was added to give the leaching solution a steady pH value of 0.5. The leaching was continued at 20°–25°C for 24 hours while stirring and blowing air into the mixture. The solution was filtered. It contained 4.7 g/l zinc and 1.08 g/l iron. Lead was not dissolved to any significant extent, but was transformed into lead sulphate having a low solubility.

The solution was extracted in counter-current flow in a set of three mixer-settler apparatuses. The extraction agent was an organic solution consisting of 25 percent by volume of di-(2-ethylhexyl)-phosphoric acid, 5 percent by volume of dodecanol, and 70 percent by volume of kerosene. The volume ratio organic solution to aqueous solution was 3 to 1. The organic solution leaving the extraction process contained 1.5 g/l zinc and 0.30 g/l iron. The aqueous solution leaving the extraction process contained 0.15 g/l zinc and 0.18 g/l iron.

The organic solution was now passed to a first stripping unit containing two mixer-settler apparatuses, and was washed here in counter-current flow with an aqueous solution coming from an electrolysis apparatus. Said aqueous solution contained 14 percent by weight sulphuric acid and 20 g/l zinc. The volume ratio was 20 to 1. The zinc was washed out from the organic solution into the aqueous solution. The resulting organic solution contained 0.02 g/l zinc and 0.33 g/l iron. The resulting aqueous solution contained electrolysis in a quantity of 30 g/l in each cycle. The solution from the electrolysis process was returned for another stripping operation.

The organic solution was now washed in counter-current flow with an aqueous solution containing 40 percent by weight of sulphuric acid in a device consisting of two mixer-settler apparatuses. Iron was transferred from the organic solution to the sulphuric acid solution. The organic solution was now returned for another extraction process.

EXAMPLE 2:

Metal hydroxide slime was collected from a plurality of zinc coating industries. After mixing the average metal content was, in per cent by weight on the solids content:

Zn - 6.6
Fe - 15.4
Cu - 1.8
Ni - 2.4
Cr - 4.4

300 kg of said slime and 9 liters of water were supplied to a leaching vessel. An aqueous solution containing 40 percent by weight sulphuric acid was added at a rate adequate for maintaining a pH value of 0.5. The leaching process was continued at 20°–25°C while stirring for 20 hours. The solution was filtered and analyzed. It contained, in grams per liter Zn - 4.17
Fe - 9.33
Cu - 0.90
Ni - 2.67
Cr - 0.34

The solution was now extracted in counter-current flow in a device containing four mixer-settlers with an organic solution consisting of 10 percent by volume of LIX 64N (manufactured by General Mills, Inc., USA) and 90 percent by volume of kerosene. The volume ratio organic solution to aqueous solution was 2.5 to 1. The resulting organic solution contained 0.36 g/l copper, whereas the contents of zinc and iron were below 0.001 g/l. The resulting aqueous solution contained, in grams per liter:

Zn - 4.16
Fe - 9.3
Cu - <0.001
Ni - 1.9
Cr - 2.7

The organic solution was washed in counter-current flow in a stripping device containing three mixer-settler apparatuses with an aqueous solution from the electrolysis of copper containing 30 percent by weight sulphuric acid and 15 g/l copper. The volume ratio organic solution to sulphuric acid solution was 30 to 1. The copper content of the organic solution was transferred to the sulphuric acid solution, which contained 28 g/l copper after the stripping operation. Copper was recovered by electrolysis from said solution in a quantity of 15 g/l in each cycle. The organic solution from the stripping operation was returned for another extraction process.

The aqueous solution from the copper extraction process was now extracted in counter-current flow in a device containing three mixer-settler apparatuses with an organic solution containing 25 percent by volume di-(2-ethylhexyl)-phosphoric acid, 5 percent by volume dodecanol, and 70 percent by volume kerosene. The volume ratio organic solution to aqueous solution was 10 to 1. The resulting aqueous solution contained, in grams per liter:

Zn - 0.04
Fe - 1.3
Ni - 1.9
Cr - 2.7

The organic solution was now washed in counter-current flow in a stripping device containing two mixer-settler apparatuses with an aqueous solution containing 14 percent by weight sulphuric acid, resulting in the zinc being washed out from the organic solution into the sulphuric acid solution. The volume ratio organic solution to sulphuric acid solution was 20 to 1. The resulting organic solution contained 0.01 g/l zinc and 0.05 g/l iron. The resulting sulphuric acid solution contained 2.8 g/l zinc and 0.001 g/l iron. Zinc sulphate was recovered by crystallization from said sulphuric acid solution in a quantity of 5 g/l zinc. Sulphuric acid was added to restore the desired concentration of 14 percent by weight, and the solution was now returned for another stripping operation. The organic solution was returned for extracting zinc and iron in another extraction process.

The aqueous solution coming from the extraction of zinc and iron was passed to a third extraction process in a device containing two mixer-settlers. The solution was extracted in counter-current flow with an organic solution consisting of 25 percent by volume dioctyl-dithiophosphoric acid and 75 percent by volume kerosene. The volume ratio organic solution to aqueous solution was 2 to 1. The resulting organic solution contained 0.95 g/l nickel. The resulting aqueous solution contained 0.02 g/l nickel and 2.7 g/l chromium.

The organic solution was now stripped in countercurrent flow in a device containing two mixer-settler apparatuses with an aqueous solution containing 50 percent by weight sulphuric acid. The dwelling time in said apparatuses was longer than that in the apparatuses referred to earlier. The volume ratio organic solution to sulphuric acid solution was 90 to 1. This stripping operation resulted in nickel and small quantities of zinc and iron being washed out from the organic solution to the sulphuric acid solution. The resulting sulphuric acid solution contained 86 g/l nickel. Nickel sulphate was recovered by crystallization from this solution in a quantity of 50 g/l nickel. Sulphuric acid was added to restore the concentration to 50 percent by weight. The solution was now returned for another stripping operation. The organic solution was returned for another extraction operation.

The aqueous solution from the nickel extraction process contained chromium and small amounts of other metals. It was neutralized with a 45 percent by weight solution of sodium hydroxide to a pH value of 8-9. Chromium hydroxide precipitated and was removed by filtration.

What is claimed is:

1. A method of recovering metal from solid metal-containing waste, such as metal hydroxide slime, comprising leaching the waste with sulphuric acid to form a metal sulphate solution having a pH value of 0-5, contacting the metal sulphate solution in a liquid extraction process with an organic solution containing an organophosphorous acid to transfer iron and zinc from the metal sulphate solution to the organic solution, contacting the organic solution in a first washing operation with an aqueous solution containing 50-200 g/l free sulphuric acid for selectively transferring zinc from the organic solution to said aqueous sulphuric acid solution, recovering zinc from said aqueous sulphuric acid solution, contacting the organic solution in a second washing operation with an aqueous solution containing 500-1000 g/l free sulphuric acid for selectively transferring iron from the organic solution to said aqueous sulphuric acid solution, and recovering iron from said aqueous sulphuric acid solution.

2. A method as claimed in claim 1, comprising leaching the metal-containing waste at a pH value of 0-5 with an aqueous solution of sulphuric acid in a quantity to produce a metal sulphate solution having a metal content of 30-60 g/l, filtering the small sulphate solution, washing the insoluble residues from the leaching operation with water, and diluting the filtered metal sulphate solution with water from the washing operation to produce a metal sulphate solution having a metal content of approximately 15 g/l.

3. A method as claimed in claim 1 for recovering metal from solid metal-containing waste wherein said waste additionally contains copper, nickel and chromium, comprising contacting the metal sulfate solution in a first liquid extraction process with a first organic solution containing a member of the group consisting of (a) a mixture of an alkyl 2-hydroxybenzophenone oxime with alpha-hydroxy oxime and (b) 8-hydroxyquinoline to transfer copper from the metal sulfate solution to said first organic solution, contacting the metal sulfate solution in a second liquid extraction process with a second organic solution containing an organophosphorus acid to transfer iron and zinc from the metal sulfate solution to said second organic solution, contacting the metal sulfate solution in a third liquid extraction process with a third organic solution containing a dialkyl dithiophosphoric acid to transfer nickel from the metal sulfate solution to said third organic solution, neutralizing the metal sulfate solution, thus treated, to precipitate chromium as chromium hydroxide, and separating said chromium hydroxide from the solution.

4. A method as claimed in claim 3, comprising contacting said first organic solution with an aqueous solution containing 200-1000 g/l free sulphuric acid to transfer copper from the organic solution to said aqueous sulphuric acid solution, and recovering copper from said aqueous sulphuric acid solution by means of electrolysis or crystallization.

5. A method as claimed in claim 4, in which the aqueous solution contains approximately 300 g/l free sulphuric acid, and copper is recovered by electrolysis.

6. A method as claimed in claim 3, in which said first, second and third liquid extraction processes are each performed at substantially the same temperature.

7. The method as in claim 6 wherein each liquid extraction is performed at a temperature of about from 25° to 50°C.

8. A method as claimed in claim 3, comprising contacting said third organic solution with an aqueous solution containing 200–1000 g/l free sulphuric acid to transfer nickel from the organic solution to said aqueous sulphuric acid solution, and recovering nickel from said aqueous sulphuric acid solution by means of electrolysis or crystallization.

* * * * *